US010955338B1

(12) United States Patent
Granger et al.

(10) Patent No.: US 10,955,338 B1
(45) Date of Patent: Mar. 23, 2021

(54) NON-CONTACT REFLECTOMETER VISION SYSTEM

(71) Applicant: Group 32 Development & Engineering, Inc., Santa Clara, CA (US)

(72) Inventors: Edward M. Granger, Novato, CA (US); Matthew Weisberg, Santa Clara, CA (US)

(73) Assignee: Group 32 Development & Engineering, Inc., Key Biscayne, FL (US)

( * ) Notice: Subject to any disclaimer, the term of this patent is extended or adjusted under 35 U.S.C. 154(b) by 0 days.

(21) Appl. No.: 16/839,039

(22) Filed: Apr. 2, 2020

Related U.S. Application Data

(60) Provisional application No. 62/828,401, filed on Apr. 2, 2019.

(51) Int. Cl.
*G01N 21/55* (2014.01)
*A23N 12/12* (2006.01)

(52) U.S. Cl.
CPC ........... *G01N 21/55* (2013.01); *A23N 12/125* (2013.01)

(58) Field of Classification Search
CPC .............................. G01N 21/55; A23N 12/125
See application file for complete search history.

(56) References Cited

U.S. PATENT DOCUMENTS

| 6,104,494 A | 8/2000 | Torbet | |
|---|---|---|---|
| 6,106,877 A | 8/2000 | Allington | |
| 2012/0057172 A1* | 3/2012 | Brunfeld | G01B 11/2441 356/511 |

OTHER PUBLICATIONS

U.S. Appl. No. 60/065,083, R. Allington and P. Torbet.

* cited by examiner

*Primary Examiner* — Hina F Ayub
(74) *Attorney, Agent, or Firm* — Law Office of Craig Bohn; Craig E. Bohn

(57) ABSTRACT

A reflectometer system for use with a non-contact actinic system includes a primary lens, and an illumination source and a detector positioned on an observation side of the primary lens opposite a goods production area and sample region. The illumination source emits an illumination beam through an illumination beam void between the primary lens and the housing, which is directed into the goods production area and sample region, and onto a flow or static sample of material to be tested. The material being tested then create a reflected beam, which shines back to the observation side of the primary lens through the primary lens to the detector. The general alignment of the illumination beam and the reflected beam create an extended sample region within the goods production area, as well as a compact reflectometer system structure.

19 Claims, 8 Drawing Sheets

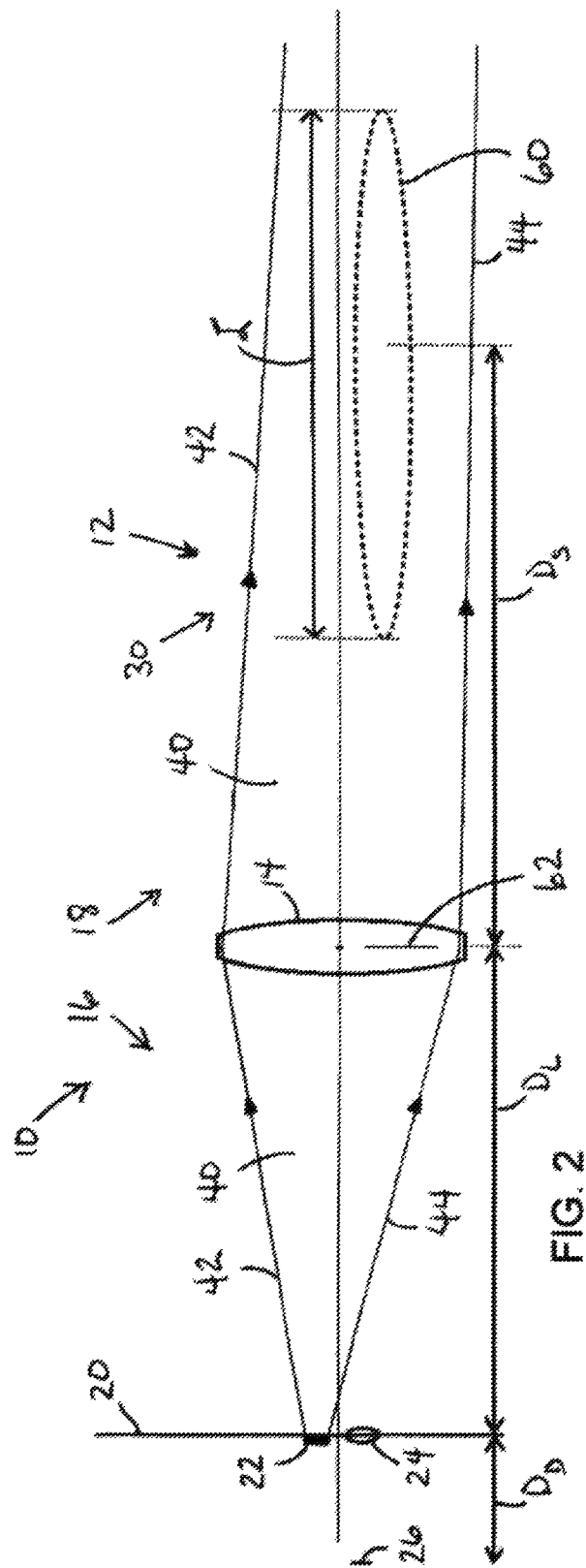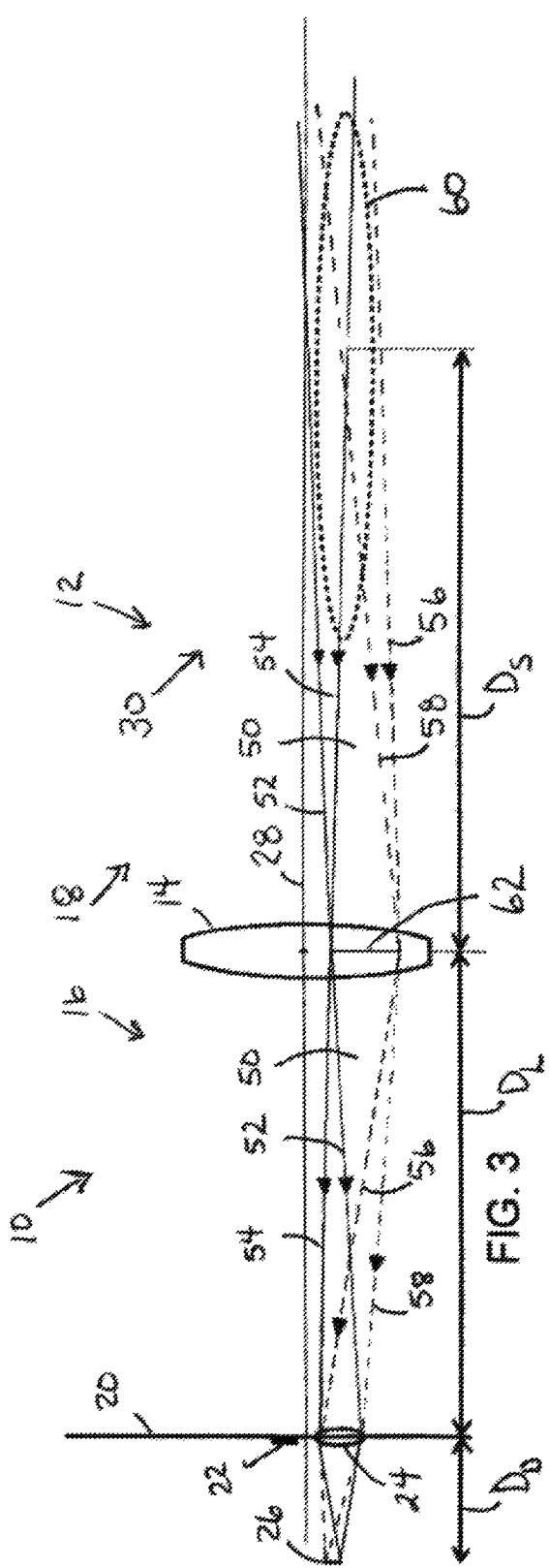

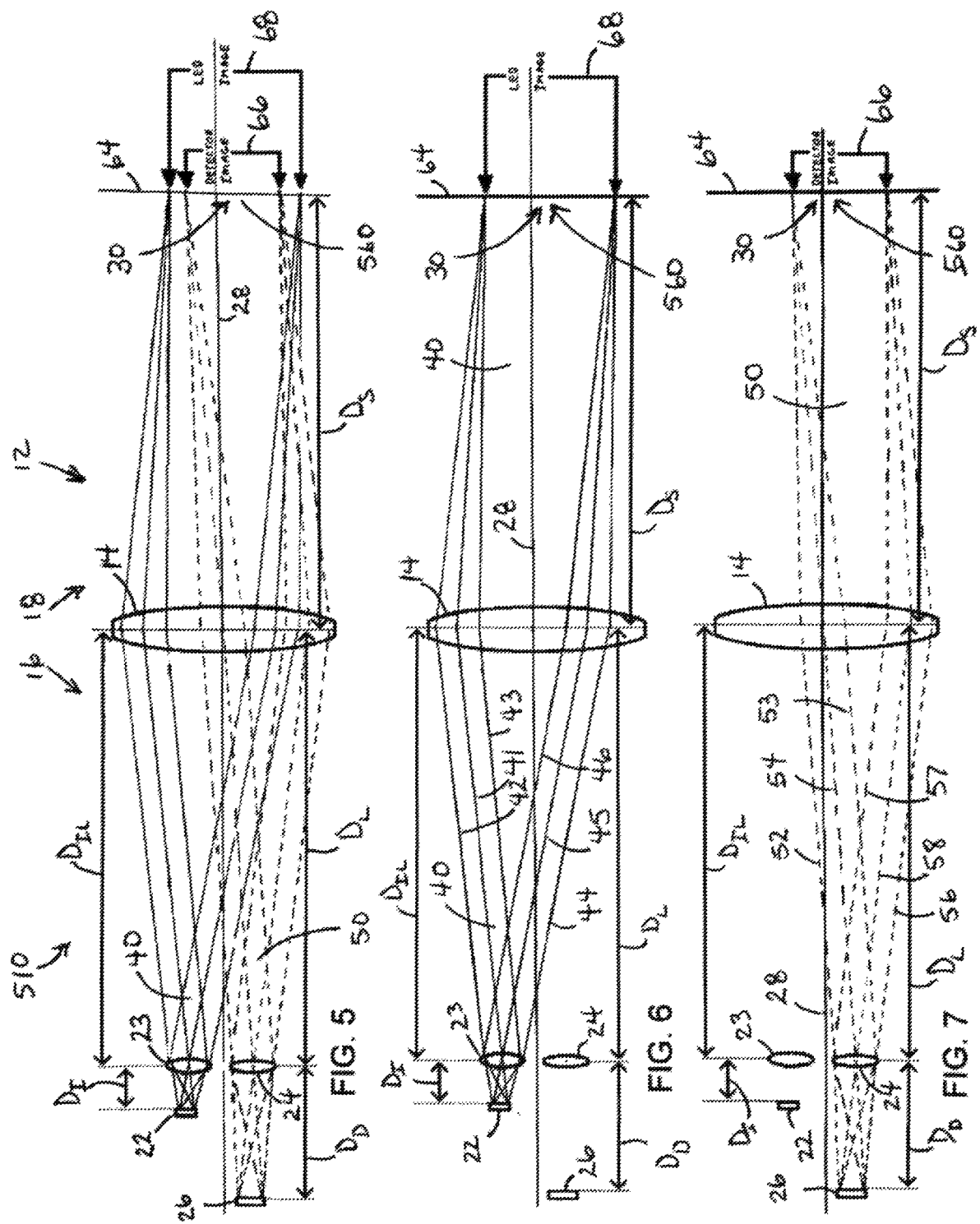

NON-CONTACT REFLECTOMETER VISION SYSTEM

CROSS-REFERENCE TO RELATED APPLICATIONS

This application claims the benefit of U.S. Application No. 62/828,401, filed on Apr. 2, 2019, by the present inventors, entitled "Non-Contact Reflectometer Vision System," which is hereby incorporated by reference in their entirety for all allowable purposes, including the incorporation and preservation of any and all rights to patentable subject matter of the inventor, such as features, elements, processes and process steps, and improvements that may supplement or relate to the subject matter described herein.

BACKGROUND OF THE INVENTION

The present invention relates to a reflectometer, and more specifically, a reflectometer for a material processing system contingent on actinic changes in the processed materials.

The appearance of a material being processed or evaluated is known to indicate achievement of a stage of the processing and other conditions or the status of an evaluated material. For example, devices for roasting a variety of food materials, such as fresh or green coffee beans, peanuts, almonds and the like, are known. When roasting coffee, the taste and fragrance of coffee depend largely on how the coffee beans have been roasted, as well as the degree to which the coffee beans have been roasted and how quickly following roasting the beans are consumed by brewing coffee with them. It is desirable to produce roasted coffee beans that are consistent in taste and fragrance.

Continuing with that example, in order to ensure proper roasting, the experienced roastmaster commonly roasts green coffee beans at a central location for distribution to multiple destinations for sale and consumption. Since coffee beans are presently roasted at a central plant for sale at multiple retail locations, such as supermarkets, stores and specialty shops, as well as coffee and espresso bars, the roasted beans must be stored and shipped before they reach the consumer. Not only is this time-consuming and costly, but in addition to cost and transportation reasons, it is not feasible to effectively distribute coffee that is roasted on a given day for sale at the various retail establishments on the same day. Thus, coffee beans presently for sale at retail establishments are seldom fresh and they are typically several days to several weeks old before they reach the consumer. This compromises the quality and especially the aroma of the coffee. Additionally, it increases the cost of the coffee because of the need to make relatively many deliveries from the roasting plant to the retail locations.

To further expound on the example, coffee beans might ideally be roasted at individual retail locations so that the roasted beans would be freshest when they ultimately reach the consumer. Unfortunately, roasting coffee beans at individual retail locations is unfeasible because of the need to have the roasting process supervised by an experienced roastmaster. The daily roasted coffee bean sales volume is typically too small to justify the high cost of a roastmaster. A roastmaster is required to control the roasting process based upon the change in color of the beans. While the color of the beans is related to the taste profile of the beans, color may be as important as the taste profile since the color of the beans is a characteristic that the average consumer would notice, i.e., it is the most prominent feature of the roasted bean. As little as a ten second variance in the time of roasting can result in a dramatic difference in the color of the beans. Hence, a key problem is the replicating of consistent roasting of green coffee beans. This problem is especially acute in batch roasting processes versus continuous roasting processes.

Use of a reflectometer with coffee bean roasting has been considered. However, the use of conventional reflectometers would require that the reflectometer make contact with the bean in order to measure the color of the bean. Additionally, this contact must take place in a plane as opposed to measuring the beans in volume. Hence, the roasting process would have to be stopped and beans selectively placed in a plane and contacted with the reflectometer in order to measure their color. Such use of conventional reflectometers would not be practical.

The roasting of coffee beans is but one example of a situation where the condition of a material may be suitably assessed if a non-contact means to actinically assess the condition were available.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a schematic diagram of the split-pupil reflectometer of FIG. 1, illustrating the illumination beams characteristics.

FIG. 3 is a schematic diagram of the split-pupil reflectometer of FIG. 1, illustrating the reflected beams characteristics.

FIG. 5 is a schematic diagram of a telecentric reflectometer in accordance with the present invention.

FIG. 6 is a schematic diagram of the telecentric reflectometer of FIG. 6, illustrating the illumination beams characteristics.

FIG. 7 is a schematic diagram of the telecentric reflectometer of FIG. 6, illustrating the reflected beams characteristics.

DETAILED DESCRIPTION OF THE EXEMPLARY EMBODIMENTS

Figure 1:
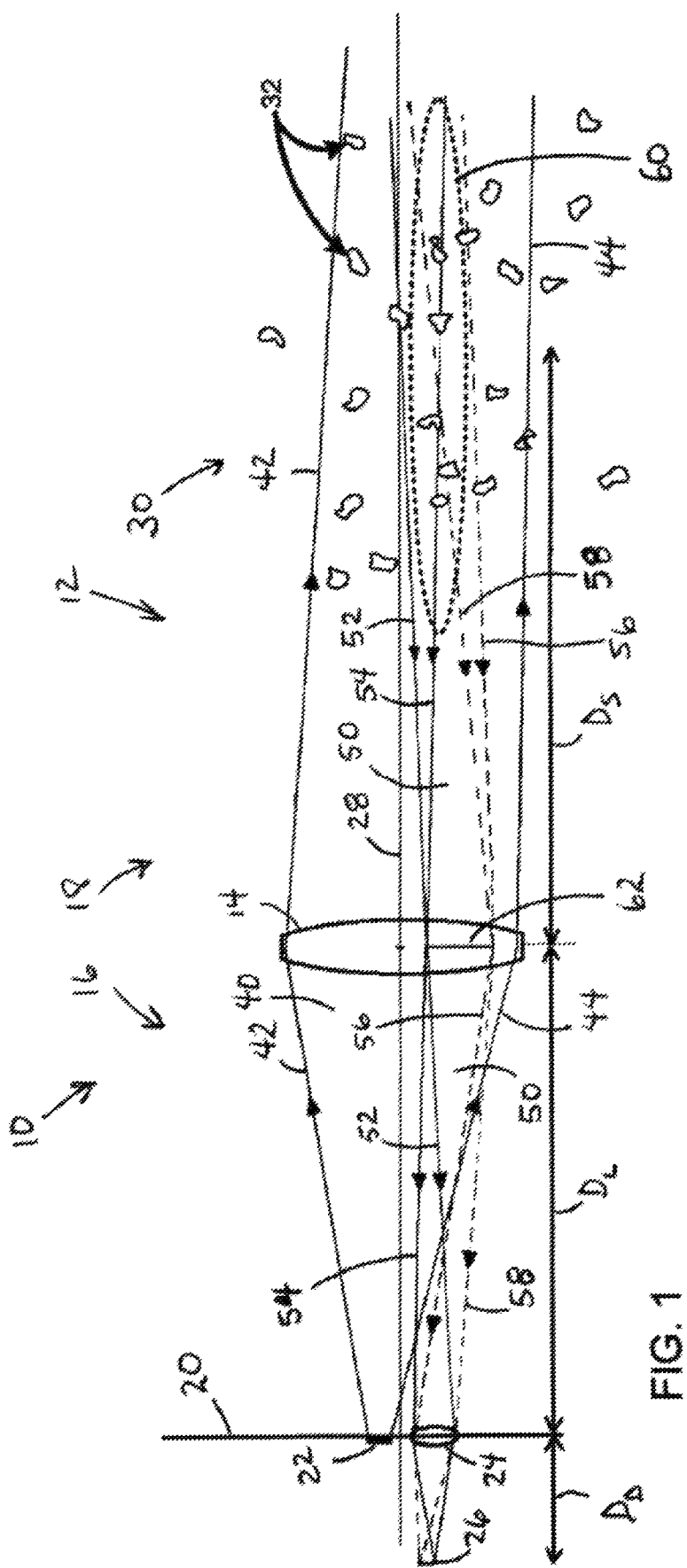
FIG. 1 is a schematic diagram of a split-pupil reflectometer in accordance with the present invention.

To facilitate understanding, identical reference numerals have been used, where possible, to designate identical elements that are common to the embodiments and figures. It is contemplated that elements and features of one embodiment may be beneficially incorporated in other embodiments without further recitation.

Reflectometer system 10 is ideally suited for use in detecting actinic changes which may be indicative of a processing step, in which the sample may be moving or static, and may be stable or actively being processed. One example may be the field of food product roasting, which may include items such as coffee beans, peanuts, almonds, and grains, to name a few. One such roasting system is disclosed in U.S. provisional patent application Ser. No. 60/065,083, by Roger A. Allington and Philip A. Torbet. Another such roasting system is disclosed in U.S. Pat. No. 6,104,494, by Philip A. Torbet and Edward M. Granger, issued on Aug. 15, 2000. Another such roasting system is disclosed in U.S. Pat. No. 6,106,877, by Roger A. Allington, Philip A. Torbet, and Edward M. Granger, issued on Aug. 22, 2000. Each of these references is hereby incorporated by reference in its entirety for all purposes related to the field of non-contact detection of color and actinic changes. The present example may focus on detecting in the visible to non-visible spectrum, and other applications may be in the infrared or above wavelengths, all of which may still be applicable to the present disclosure and claims.

FIGS. 1, 2, and 3 schematically illustrate exemplary split-pupil reflectometer system 10 in accordance with the present invention. In the exemplary embodiment, the reflectometer system 10 may be housed within an enclosure (See FIG. 9) to create an illumination shielded area 12, where the effects of illumination sources from outside the system are eliminated or reduced to a level that would not impact the accuracy of the reflectometer system 10. The exemplary reflectometer system 10 may comprise a primary lens 14. In the exemplary reflectometer system 10 a primary lens 14 is positioned within the illumination shielded area 12 and the primary lens 14 delineates an observation side 16 and a sample side 18, with the primary lens 14 intermediate the observation side 16 and a sample side 18.

In the exemplary embodiment, an observation wall 20 is positioned on the observation side 16 a primary lens distance $D_L$ from the primary lens 14. The centerline 28 may be understood to pass through the center of the primary lens 14 generally perpendicular to the orientation of the primary lens 14. The centerline 28 may also be understood to pass through the observation wall 20 perpendicular to the observation wall. In the exemplary embodiment, an illumination source 22 and an imaging lens 24 may be positioned at the observation wall 20 on either side of the point where the centerline 28 passes through the observation wall 20. For reference during this example, one side of the centerline 28 will be considered upper, and one sign considered lower, and will be used within this application to establish up and higher, versus down and lower. In the exemplary embodiment, the illumination source 22 is on the upper side of centerline 28, and the imaging lens 24 is on the lower side of centerline 28. In the exemplary embodiment, a detector 26 may also be positioned on the lower side of centerline 28 opposite imaging lens 24 from the primary lens 14. In the exemplary embodiment, detector 26 may be a distance detector focal distance $D_D$ from the observation wall 20 and the imaging lens 24. Detector 26 may be in the form of a photodetector.

In the exemplary embodiment, the illumination source 22 may include a light emitting diode ("LED"). The illumination source may also include an aspheric lens to achieve a controlled incoherent light beam 40, for consistent and uniform illumination of the goods 32. Alternatively, illumination source 22 may include a half ball lens to achieve a controlled incoherent light beam 40. Various lenses suitable for use as primary lens 14 and imaging lens 24 may be available in the marketplace. Edmonds Optics, Inc., of Barrington N.J., may be able to provide a 25 mm diameter primary lens 14 with a 50 mm focal length, and a 10 mm diameter imaging lens 24, with a 15 mm focal length.

In the exemplary embodiment, a goods production area 30 may exist within sample side 18. Goods production area 30 is an area in which goods 32 that are being occupy during at least some portion of the processing duration. The goods 32 may be either static or moving when they occupy the goods production area 30.

Focusing now primarily in FIGS. 1 and 2, the illumination beam 40 produced by illumination source 22 is shown to project across the observation side 16 to primary lens 14, where it is inwardly focused by the primary lens 14 into the goods production area 30 on sample side 18. It may be appreciated that illumination beam 40 may have an illumination beam upper boundary 42 and an illumination beam lower boundary 44, which together define the area within which the illumination beam 40 creates a region of constant illumination, which may thoroughly and uniformly illuminate goods 32 within the goods production area 30.

Focusing now primarily on FIGS. 1 and 3, the reflected beam 50 is depicted. In the exemplary embodiment, reflected beam 50 may be created by the illumination beam 40 acting on the goods 32 within the goods production area 30. The characteristics and boundaries of reflected beam 50 are determined by the shape and positioning of the primary lens 14, the shape and positioning of the imaging lens 24, the size of detector 26, the proximity of detector 26 to the centerline 28 and the illumination source 22, the detector focal distance $D_D$, and the primary lens distance $D_L$. It may be appreciated that reflected beam 50 may have a reflected beam upper boundary 52, a reflected beam medial upper boundary 54, a reflected beam lower boundary 56, and a reflected beam medial lower boundary 58. A collecting volume region 60 may exist between the reflected beam upper boundary 52 and the reflected beam lower boundary 56, and be generally centered at the intersection of reflected beam medial upper boundary 54 and reflected beam medial lower boundary 58 a sample distance $D_S$ from the primary lens 14. In the exemplary embodiment, the imaging lens 24 focuses reflected beam 50 returning from the collecting volume region 60 onto detector 26. The reflected beam 50 traveling to the imaging lens 24 and detector 26 passes through the primary lens 14 defining a virtual detector 62 on primary lens 14. In the exemplary embodiment, for virtual detector 62 is positioned in the lower portion of primary lens 14, below the centerline 28.

In the exemplary embodiment, the illumination source 22 is positioned opposite the centerline from detector 26 and imaging lens 24. Positioning the illumination source 22 and the detector 26 and imaging lens 24 near to centerline 28 may support a collecting volume region 60 of a favorably long length L. A collecting volume region 60 with a and extended length L may permit a greater goods production area 30 in which to process goods 32.

In the exemplary embodiment, the primary lens 14 may be a convex lens that refracts light passing through in a narrowing manner. The exemplary primary lens 12 refracts reflected beam 50 in a narrowing manner onto primary lens 14. Imaging lens 24 may be positioned at or within the focal point of primary lens 14. In the exemplary embodiment, the imaging lens 24 may also be a convex lens, which, if positioned within the focal point of primary lens 14, may create a focused beam from reflected beam 50 to precisely direct the reflected beam 50 onto detector 26.

Figure 4:
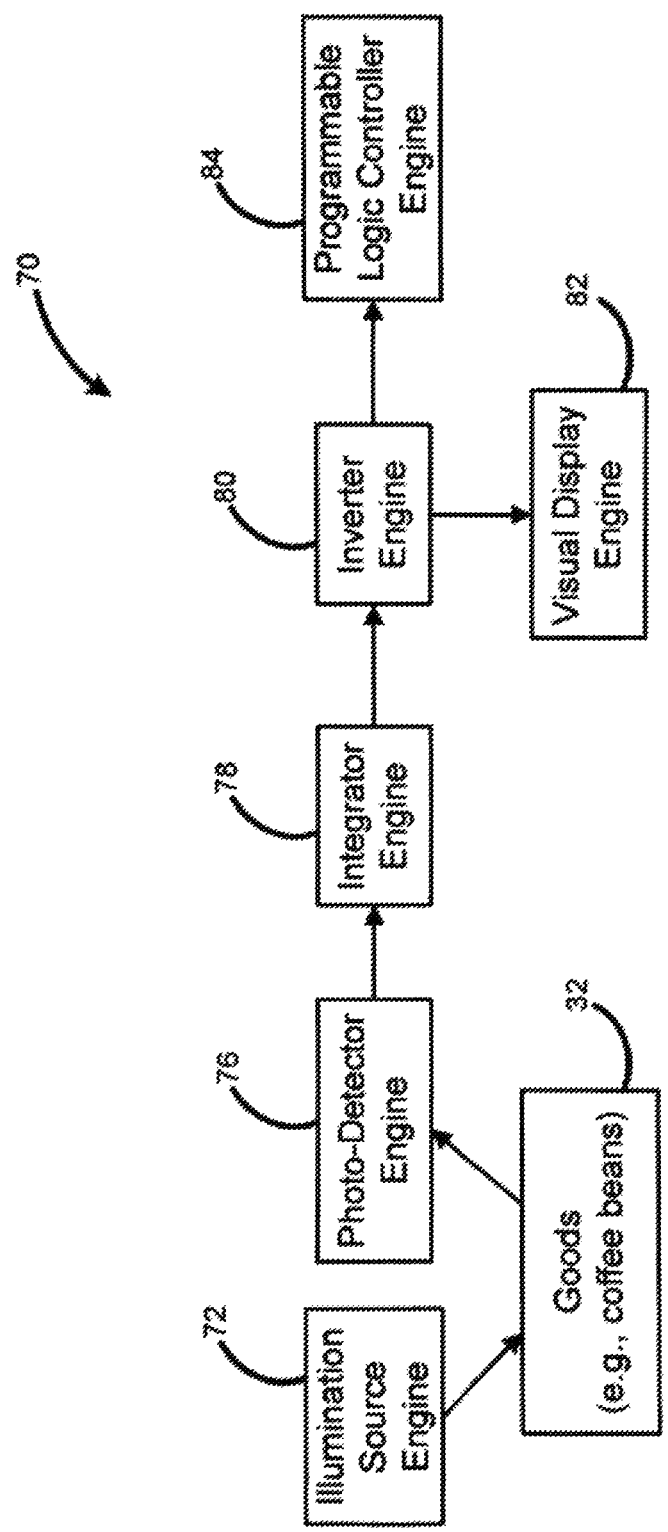
FIG. 4 is a block diagram illustrating exemplary circuitry of a reflectometer system in accordance with the present invention.

Referring now primarily to FIG. 4, an exemplary electrical circuitry system 70 for the reflectometer includes an illumination source engine 72 (including exemplary system illumination source 22), a photodetector engine 76 (including exemplary detector 26), an integrator engine 78, an inverter engine 80, and a visual display engine 82.

As previously described, illumination source engine 72 may produce illumination from illumination source 22, which may admit a reflected beam 50 that is incident upon goods 32. In this example the goods 32 may be viewed as coffee beans 32 being roasted. The illumination source 22 may be directed upon the coffee beans 32. Light from the illumination beam 40 is then reflected as the reflected beam 50 from the coffee beans 32. Reflected beam 50 may pass through primary lens 14 to reach detector 26. In the exemplary embodiment, an imaging lens 24 may be positioned a primary lens distance $D_L$ from the primary lens 14. The primary lens distance $D_L$ is influenced by the focal length of the primary lens 14, and specifically the area of the primary lens 14 in which the virtual detector 62 is manifested. Establishing appropriate focal lengths for the imaging lens 24 and the primary lens 14, which determine the optimal detector focal distance $D_D$, and primary lens distance $D_L$, permits substantially and effectively focusing the reflected beam 50 on the detector 26.

The photodetector engine 76 may generate curves of light intensity and converts the received light into a voltage or current that is passed along to integrator engine 78 for conversion of the captured date into useful information. Integrator engine 78 may be a transimpedance amplifier. Thus, the output voltage of the integrator engine 78 is the integral of the input current with respect to time and, based upon the capacity of the roasting drum, integrator engine 78 produces a slowly changing signal.

The signal produced by integrator engine 78 is passed along to inverter engine 80. As the reflected beam 50 detected by the detector 26 decreases, the current or voltage signal output by the photodetector correspondingly goes decreases. Inverter engine 80 may be used to invert the signal such that as the signal from the photodetector decreases, the inverter engine 80 may increase the ultimate output signal.

The inverted output signal is then passed along to visual display engine 82, which may comprise a plurality of LED sequential bars in the form of a bar graph. These individual LEDs may then be lit corresponding to the inverted output signal to allow monitoring of the detected reflectivity.

Finally, the output signal is also passed from the inverter engine 80 to a programmable logic controller engine 84 within the roasting system. The programmable logic controller engine 84 may have a shut-off threshold built-in for each type of goods 32 being processed, or in this example, coffee beans 32 being roasted. Thus, based upon the type of coffee bean being roasted, and the desired degree of roasting, the programmable logic controller engine 84 may terminate the roasting process when the output signal reaches the appropriate threshold indicating that the roasting of the coffee beans 32 is finished.

Additionally, programmable logic controller engine 84 may include logic that controls the reflectometer system 10, such that it selectively may differentiate goods 32, such as beans, peanuts, almonds, and grains, for example, from the background such that the reflectometer system 10 may only register solid product reflectivity. Objects outside the illumination beam 40 will not reflect signals back to the sensor based on the logic. For example, the sensor will not detect of a wall of a rotating roasting drum, because it is outside the sensing range of the unit, i.e., outside the illumination beam 40.

In accordance with another aspect of an exemplary embodiment of the present invention, since current to illumination source engine 72 may vary slightly, thereby causing the reflected signal to vary, reflectometer system 10 include a signal feedback conditioning circuit in order to maintain an accurate laser output signal. Such a signal feedback conditioning circuit is generally known in the art and ensures that in real time, the laser output is constant such that the reflected signature is accurate thereby helping ensure precise reflective sensing.

Accordingly, as can be seen, the present reflectometer system 10 may allow for consistent and easily replicable processing of goods where process steps are may be indicated by color. Termination of the roasting process for roasting coffee beans may greatly increase uniformity from batch to batch. As the coffee beans are roasted, their color changes. As the color changes, the amount of light reflected decreases. Since the wavelength of the light being supplied to the beans may selected based upon maximum actinic response, it may be easily determined when a stage in the roasting process is reached, such as completion, based upon detection of reflected light beams of the selected wavelength. Thus, the roasted beans consistently may have the desirable color and aroma, which may be important characteristics easily noticed by consumers, as well as the desired taste.

The reflectometer system 10 may allow for the roasting of items such as coffee beans, peanuts, almonds and the like, in small batches without the need for a roastmaster or individual operator control. A programmable logic controller engine 84 may the roasting process based on signals received from the reflection of the items being roasting and terminate processing based upon the built-in thresholds.

Referring now primarily to FIGS. 5, 6, and 7, an exemplary telecentric split-pupil reflectometer 510 is depicted. In the exemplary reflectometer system 510 a primary lens 14 is positioned within the illumination shielded area 12 and the primary lens 14 delineates an observation side 16 and a sample side 18, with the primary lens 14 intermediate the observation side 16 and a sample side 18.

A sample surface 64 may be positioned on the sample side 18 a sample distance $D_S$ from the primary lens 14. As in reflectometer 10, above, reflectometer 510 may be understood to have a centerline 28 running the length of reflectometer 510 through the center of primary lens 14, perpendicular to the plane of primary lens 14. In the exemplary embodiment, the sample surface 64 may also be perpendicular to the plane of the primary lens 14. In the exemplary embodiment, an illumination source 22, an illumination lens 23, an imaging lens 24, and a detector 26 may be positioned on the observation side 16 opposite the sample surface 64. In the exemplary embodiment, the illumination source 22 may generate an incoherent illumination beam 40. Illumination beam 40 may passed through illumination lens 23, which may focus illumination beam 40 on the primary lens 14. The convex primary lens 14 may focus the illumination beam 40 on the sample surface 64, which may create an illumination image 68 on sample surface 64.

In the exemplary embodiment, the illumination source 22 may be an illumination focal distance $D_I$ from the illumination lens 23. In the exemplary embodiment, the illumination lens 23 may be an illumination lens distance $D_{IL}$ from the primary lens 14. Illumination focal distance $D_I$ and the illumination lens distance $D_{IL}$, may vary, and may depend on the diameter and focal length of illumination lens 23 and the size of primary lens 14, and the desired size of the illumination shielded area 12.

In the exemplary embodiment, detector 22 may be a detection focal distance $D_D$ from the imaging lens 24. As with the illumination focal distance $D_I$, the detection focal distance $D_D$ may vary, and may depend on the diameter and focal length of imaging lens 24 and the size of primary lens 14, and the desired size of the illumination shielded area 12. In the exemplary embodiment, the illumination source 22 and illumination lens 23 are positioned opposite the centerline 28 from the imaging lens 24 and detector 26. Favorable results have been obtained by keeping the pair of the illumination source 22 and illumination lens 23, and the pair of the imaging lens 24 and detector 26, uniformly close to the centerline 28. Such positioning may extend the distance over which detection may be effectively accomplished on the sample side 18.

Focusing now primarily in FIGS. 5 and 6, the illumination beam 40 produced by illumination source 22 is shown to project across the observation side 16 to primary lens 14, where it is inwardly focused by the primary lens 14 into the goods production area 30 on sample side 18. It may be appreciated that the illumination beam 40 created by the illumination source 22 is comprised of an infinite number of beams that range from an illumination beam upper boundary 42, initiated at the upper edge of the illumination source 22, to an illumination beam lower boundary 44, initiated at the lower edge of the illumination source 22. For simplicity, FIGS. 5 and 6 depict three beams from each of these origins of the illumination beam 40—the upper and lower boundary beams (42, 44), the upper and lower medial beams (41, 45), and the upper and lower distal beams (43, 46). In this way, some of the internal characteristics of the illumination beam 40 as it is manipulated by illumination lens 23 and primary lens 14, may be appreciated, and may aid one of ordinary skill in the art attempting to practice the teachings of this disclosure.

Focusing now primarily on FIGS. 5 and 7, the reflected beam 50 is depicted. In the exemplary embodiment, reflected beam 50 may be created by the illumination beam 40 acting on the goods 32 within the goods production area 30, which is within the illumination image 68. The characteristics and boundaries of reflected beam 50 may be influence and determined by the shape and positioning of the primary lens 14, the shape and positioning of the imaging lens 24, the size of detector 26, the proximity of detector 26 to the centerline 28 and the illumination source 22, the illumination focal distance $D_I$, the illumination lens distance $D_{IL}$, and the detector focal distance $D_D$, the primary lens distance $D_L$. In the exemplary embodiment, the imaging lens 24 focuses reflected beam 50 returning from the collecting region 560 onto detector 26. The reflected beam 50 traveling to the imaging lens 24 and detector 26 passes through the primary lens 14.

It may be appreciated that the reflected beam 50 created by the illumination reflecting off goods 32 at the collecting region 560 is comprised of an infinite number of beams that range from a reflected beam upper boundary 52, initiated at the upper edge of the detector 26, to a reflected beam lower boundary 56, initiated at the lower edge of the detector 26. For simplicity, FIGS. 5 and 7 depict three beams of the reflected beam 50 from each of detector edges—the upper and lower boundary beams (52, 56), the upper and lower medial beams (54, 58), and the upper and lower distal beams (53, 57). In this way, some of the internal characteristics of the reflected beam 50 as it is manipulated by imaging lens 24 and primary lens 14, may be appreciated, and may aid one of ordinary skill in the art attempting to practice the teachings of this disclosure.

Figure 8:
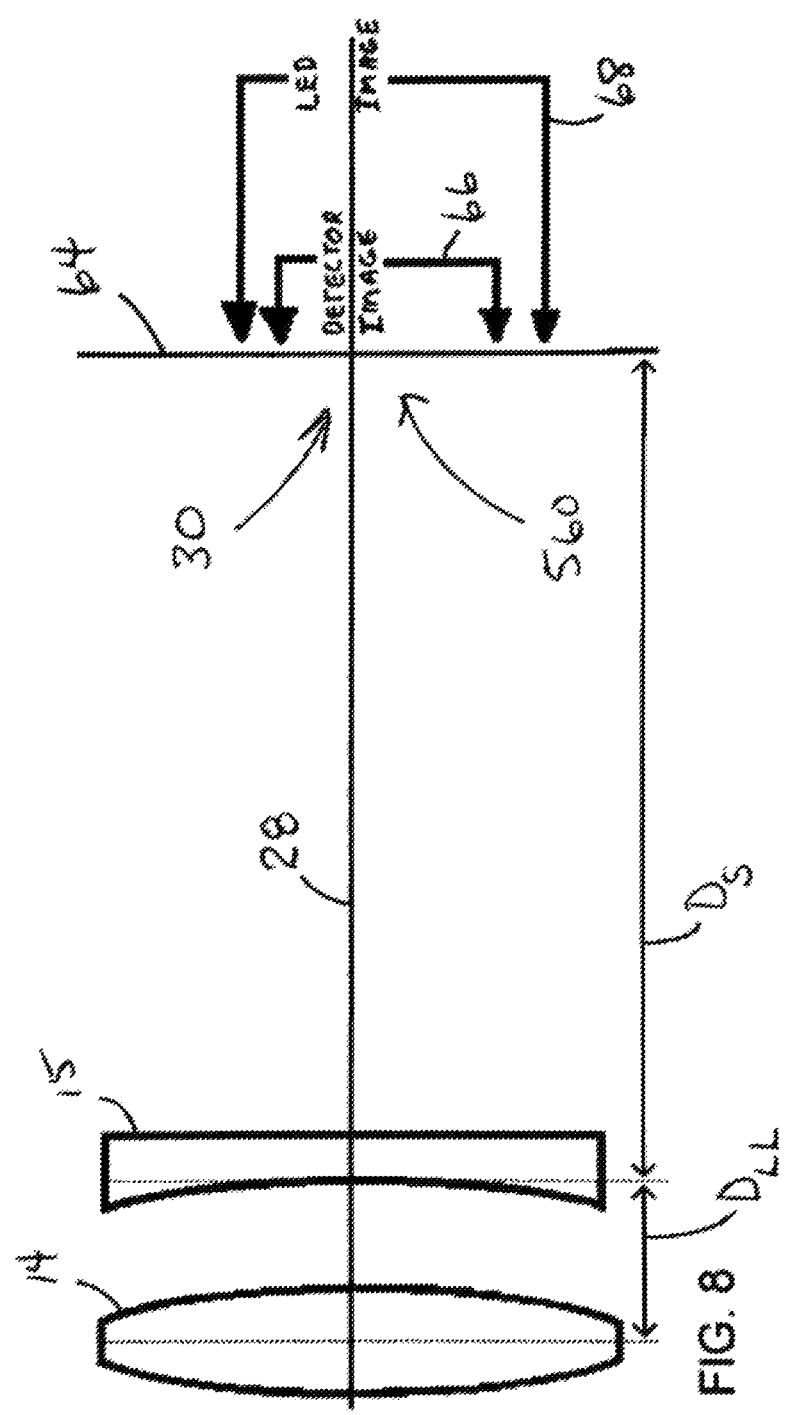
FIG. 8 is a schematic diagram of an alternate sample side configuration of the telecentric reflectometer depicted in FIG. 6.

Referring now additionally to FIG. 8, an additional exemplary embodiment may include a concave lens 15 to further shape the illumination beam 40 and reflected beam 50. In the exemplary embodiment, concave lens 15 is positioned intermediate primary lens 14 and the sample surface 64. Exemplary concave lens 15 is a lens-to-lens distance $D_{LL}$ from primary lens 14. In this exemplary embodiment, the sample distance $D_S$ is measured from the concave lens 15 to the sample surface 64.

Figure 9:
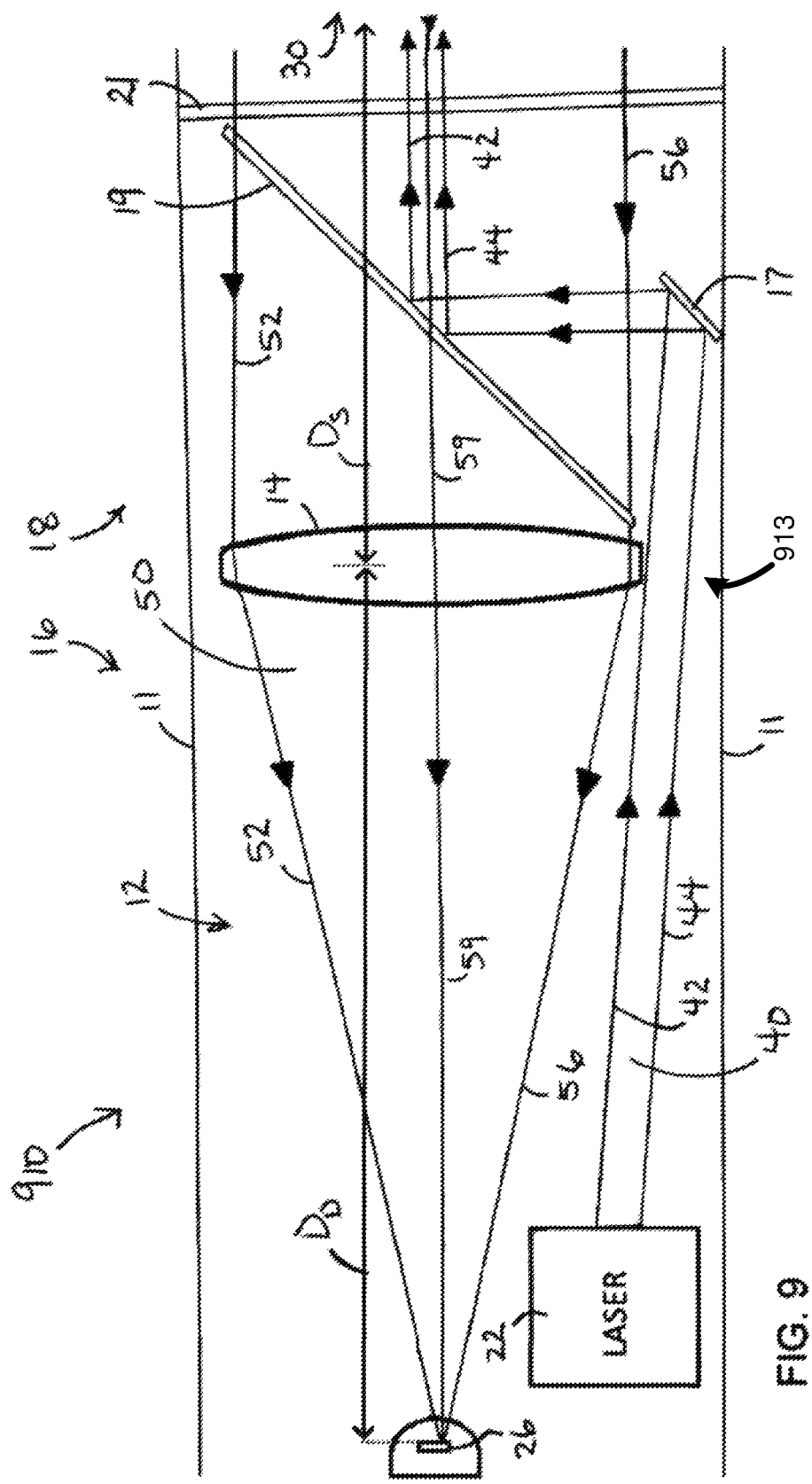
FIG. 9 is a schematic diagram of an alternate reflectometer employing a mirrored laser illumination source in accordance with the present invention.

Referring now primarily to FIG. 9, an exemplary reflectometer 910 is depicted. In the exemplary reflectometer system 910 a primary lens 14 is positioned within a housing 11, which may create an illumination shielded area 12, and the primary lens 14 may delineate an observation side 16 and a sample side 18, with the primary lens 14 intermediate the observation side 16 and a sample side 18.

In the exemplary embodiment, an illumination source 22 and detector 26 may be positioned within the observation side 16 of the illumination shielded area 12. A potentially suitable detector may include a detector made by Advanced Photonics, Inc., of Camarillo, Calif., model API PDB-C158F. Exemplary illumination source 22 is a coherent light source, and may be a laser diode that creates a collimated illumination beam 40. Potentially suitable lasers may include an L780, 780 nm laser, and available from Thorlabs, Inc., of Newton, N.J. Other forms of diodes, in combination with a collimator lens, may also provide a suitable coherent illumination beam 40. The exemplary embodiment may have one or more of a front side mirror 17, a beam splitter 19, and bandpass filter 21. Thorlabs, Inc., may also be a supplier of these suitable components, including a 780 nm polarizing beam splitter, model PBSW=780R, 25×36 mm, and a colored glass bandpass filter in various bandwidth ranges that may span 780 nm, model FGB25 and a 1 inch round color filter, model BG3.

In the exemplary embodiment, a beam splitter 19, and a bandpass filter 21 may be positioned on the sample side 18. Exemplary beams splitter 19 and bandpass filter 21 may be positioned in line with the detector 26 and primary lens 14. Exemplary illumination beam 40 may be directed past the edge of primary lens 14 through the illumination beam void 913. In the exemplary embodiment, illumination beam void 913 is a gap between the primary lens 14 and the housing 11. In this fashion, the illumination beam void 913 may be described as intermediate an edge of the primary lens and the housing 11.

In the exemplary embodiment, the illumination beam 40 passes through the illumination beam void 913 to reflect off the front surface mirror 17 positioned on the sample side 18. In the exemplary embodiment, the reflected illumination beam 40 is directed toward the beam splitter 19. The exemplary beam splitter 19 is designed and configured to reflect the illumination beam 40 away from the primary lens 14 when positioned at a 45-degree angle. (The precise angle may vary in degrees, as determined by the manufacturer, but may still be considered 45-degrees.) The illumination beam 40 may then pass through the bandpass filter 21, into a goods production area 30.

The illumination beam 40 may illuminate goods 32 within the goods production area 30. The intersection of the illumination beam 40 with the goods production area 30 may form a collecting volume region 60. In the exemplary embodiment, the sample distance $D_S$ is the distance from the primary lens 14 to the collecting volume region 60. Since the illumination beam 40 is a coherent light source, and the orientation of the detector 26 and primary lens 14 enable the inverse searchlight principle, the collecting volume region 60 may extend for a substantial sample distance $D_S$ away from the primary lens 14. A substantially long sample distance $D_S$ may allow for a large goods production area 30 in which goods 32 may be processed and monitored by reflectometer system 910.

In the exemplary collecting volume region 60, the illumination beam 40 may impact on the goods 32 to create reflected beam 50. Reflected beam 50 may have a reflected beam upper boundary 52, a reflected beam lower boundary 56, and a reflected beam center 59. In the exemplary embodiment, the reflected beam 50 then passes back through the bandpass filter 21, the beam splitter 19, the primary lens 14, to reach the detector 26. In the exemplary embodiment, the beam splitting characteristics of beam splitter 19 may direct illumination beam 40 into the goods production area 30, and permit the passing of reflected beam 50 from goods production area 30 through to the primary lens 14. In the exemplary embodiment, the reflected beam is directed by the primary lens to the detector 26. As in the embodiment shown in FIG. 8, a concave lens 15 may be positioned between the primary lens 14 and the detector 26 to further shape the reflected beam 50.

Figure 10:
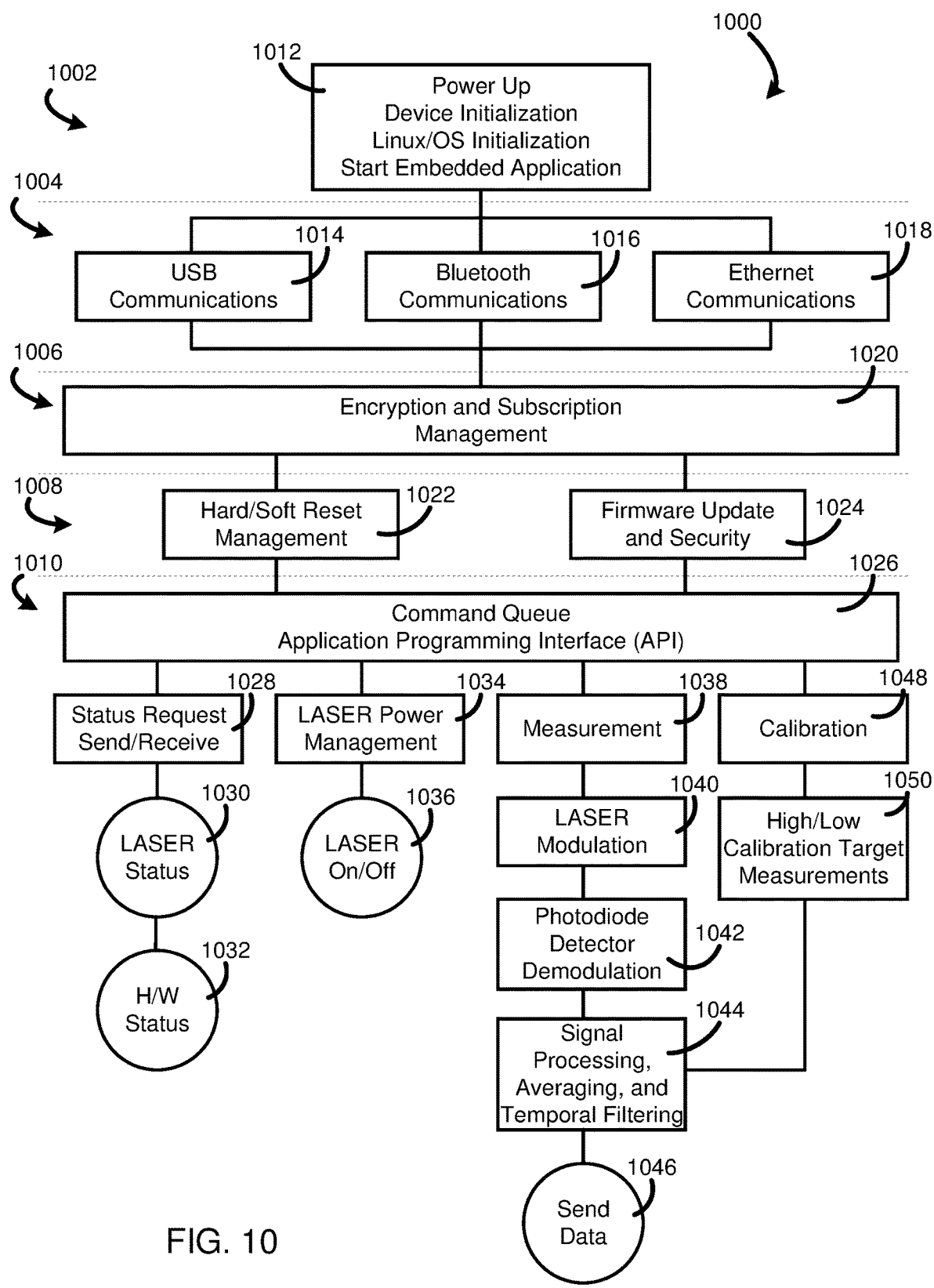
FIG. 10 is a schematic diagram of an exemplary control system for a reflectometer system in accordance with the present invention.

Referring now primarily to FIG. 10, the exemplary embodiment may have a control system 1000 for the exemplary reflectometer system 10. The exemplary control system is shown to have an initiate engine 1002, a communicate engine 1004, a verify engine 1006, an adjust engine 1008, and operate engine 1010. In the exemplary control system 1000, the initiate engine 1002 may include initialization processes 1012 to initialize the device. Device initialization processes 1012 may include steps and routines that initialize both hardware and software elements, which may include an FRS communication system. Initialization processes 1012 may include powering up devices and components, firmware initialization of devices, operating system software initialization, and the initialization of embedded application routines.

In the exemplary embodiment, instructions from the initiate engine 1002 may be communicated to the verify engine 1006, the adjust engine 1008, and the operate engine 1010, through a the communicate engine 1004. The communication pipeline of the communicate engine 1004 may comprise one or more of a USB communication device 1014, Bluetooth communication device 1016, and ethernet communication device 1018. In the exemplary embodiment, instructions coming through the communicate engine 1004 are routed to a verify engine 1006. In the exemplary embodiment verify engine 1006 may handle encryption and decryption, as well as subscription management, where users of the control system 1000 are verified, and their access to specific routines and data is enabled.

In the exemplary embodiment, adjustments to the control system 1000 may occur after verification in the adjust engine 1008. Adjustments may include hardware and software reset and management of the reset routines 1022, as well as firmware updates and management of security issues 1024.

In the exemplary embodiment, after adjustments are made in the adjustment engine 1008, the operate engine 1010 uses the transmitted instructions from the prior elements of the control system 1000 to establish the command queue and coordinate the application programming interface (API) 1026. Within the operate engine 1010, instructions may be routed to the status request engine 1028 where requests may be sent from or received. Requests may be for the laser status 1030 and the hardware status 1032, among other things. Also, within the operate engine 1010, instructions may be routed to the laser power management engine 1034. The laser power management engine 1034 may control turning the laser on and off 1036, among other functions of which a suitable laser may be capable. Also, within the operate engine 1010, instructions may be routed to the measurement engine. The measurement engine 1038 may affect laser modulation 1040, photodiode detection demodulation 1042, signal processing, averaging, and temporal filtering 1044, as well as the capacity to send data at 1046, among other measurement functions. Also, within the operate engine 1010, instructions may be routed to the calibration engine 1048. The calibration engine 1048 may assess the high and low calibration target measurements 1050 of the laser operation, among other things that may be calibrated within the reflectometer system 10. In the exemplary embodiment, the high and low calibration target measurements 1050 may be linked to signal processing, averaging, and temporal filtering 1044 in the measurement engine 1038. Items measured in the measurement engine 1038 may be particularly well suited to calibration to achieve target measurements.

Figure 11:
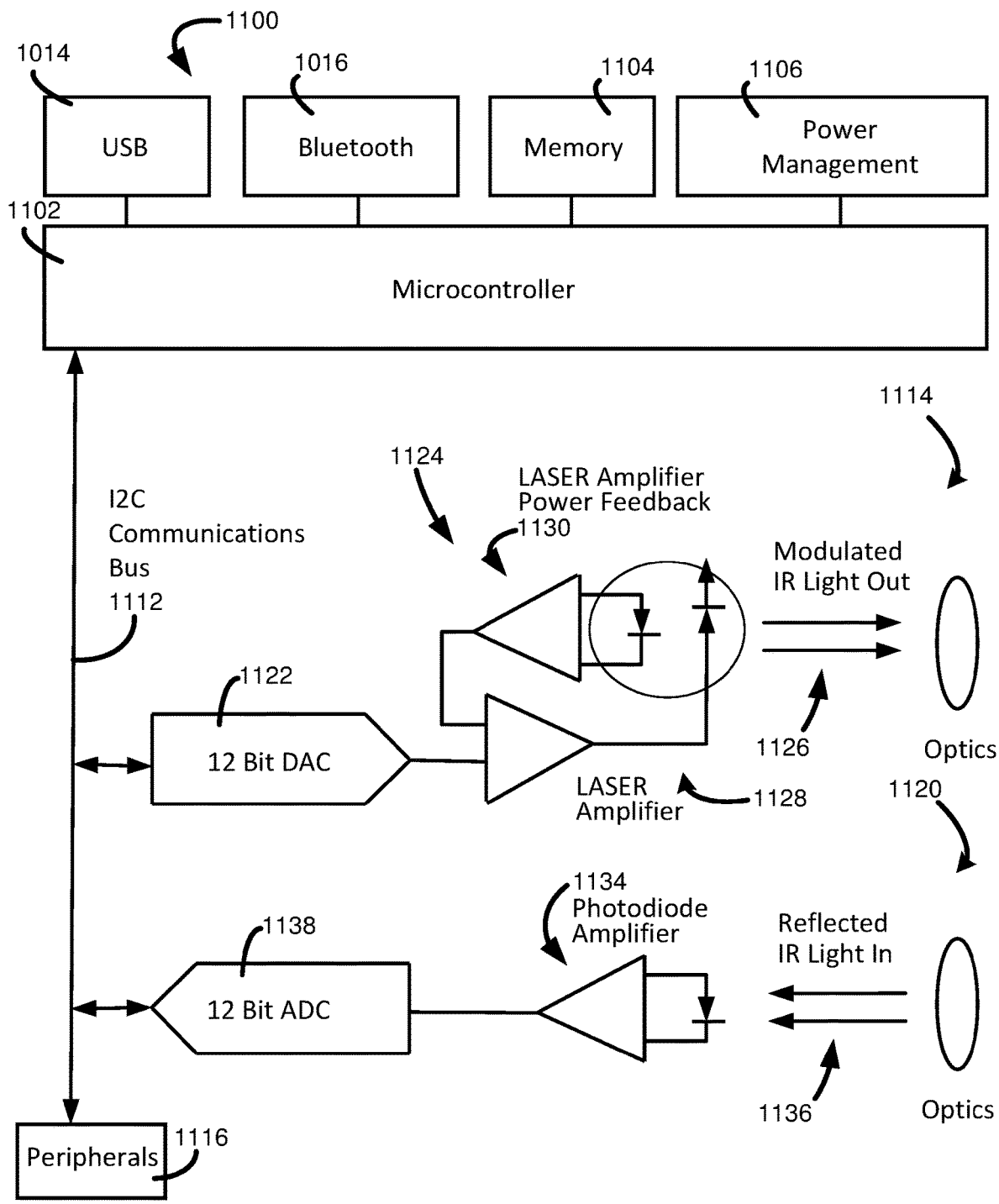
FIG. 11 is an illustration of exemplary circuitry for a reflectometer system in accordance with the present invention.

Referring now primarily to FIG. 11, an illustration of exemplary circuitry offers an exemplary laser hardware/software (hereinafter "HW/SW") interface 1100 of an exemplary reflectometer system. The exemplary HW/SW interface 1100 may exchange communications with the operate engine 1010 of control system 1000 through the communicate engine 1004. In the exemplary embodiment, the communicate engine 1004 is represented by USB communication 1014 and Bluetooth communication 1016, but other pipeline elements may be used. In the exemplary embodiment, a microcontroller 1102 facilitates the function of the HW/SW interface 1100, using a memory engine 1104 and a power management engine 1106. The exemplary microcontroller 1102 executes software instructions that facilitate communication across an inter-integrated circuit (hereinafter "I2C") communications bus 1112 with the laser engine 1114, as well as various peripherals 1116 with which a HW/SW interface 1100 may be configured.

In the exemplary embodiment, laser engine 1114 may be comprised of a laser output engine 1118 and a signal detection engine 1120. The exemplary laser output engine 1118 may comprise a 12-bit digital to analog (hereinafter "DAC") converter 1122 and a laser control engine 1124, which create, control, and modulate and illumination signal 1126. In the exemplary embodiment, the laser control engine 1124 comprises both a laser amplifier 1128 and a laser amplifier power feedback module 1130, which may permit more useful control of the illumination signal 1126 on the optics. In the exemplary embodiment, the optics may include the illumination lens 23 and the primary lens 14.

In the exemplary signal detection engine 1120, a photodiode and amplifier 1134 are used to do detect the reflected light 1136 coming from the optics and the goods 32. In the exemplary embodiment, the optics may include the imaging lens 24 and the primary lens 14. A data signal created by the photodiode and amplifier 1134 is transmitted to a 12-bit analog to digital (hereinafter "ADC") converter 1138. The exemplary ADC 1138 relays the data to the microcontroller 1102 via I2C communications bus 1112.

While the foregoing is directed to exemplary embodiments of the present invention, other and further embodiments of the invention may be devised without departing from the basic scope thereof, and the scope thereof is determined by the claims that follow.

We claim:

1. A reflectometer system, comprising:
   a primary lens positionable within an illumination shielded area, the illumination shielded area within a housing;
   the primary lens having an observation side and a sample side;
   an illumination source on the observation side of the primary lens capable of generating an illumination beam to project illumination into the illumination shielded area, and a detector positionable on the observation side of the primary lens to detect illumination directed onto the detector from within the illumination shielded area;
   a front surface mirror and a beam splitter within the illumination shielded area on the sample side of the primary lens;
   a goods production area on the sample side of the primary lens;
   the front surface mirror positionable to reflect an illumination beam from the illumination source onto the beam splitter; and
   the beam splitter positionable to reflect the illumination beam away from the primary lens into a goods production area, and to permit a reflected beam from the goods production area to pass through to the primary lens and directed to the detector.

2. The reflectometer system of claim 1, further comprising:
   an illumination beam void intermediate the primary lens and the housing; and
   the illumination beam void intermediate the illumination source and the front surface mirror.

3. The reflectometer system of claim 2, further comprising:
   the illumination beam projectable between the reflected beam and the housing.

4. The reflectometer system of claim 1, further comprising:
   the illumination beam projectable between the reflected beam and the housing.

5. The reflectometer system of claim 1, further comprising:
   a bandpass filter positionable between the beam splitter and the goods production area.

6. The reflectometer system of claim 1, further comprising:
   the beam splitter positionable at about a 45-degree angle to the primary lens.

7. The reflectometer system of claim 1, further comprising:
   the illumination source and the beam splitter matched for the same illumination wavelength range.

8. The reflectometer system of claim 1, further comprising:
   the illumination source and the bandpass filter matched for the same illumination wavelength range.

9. The reflectometer system of claim 1, further comprising:
   the illumination source configurable to generate the illumination beam in the 780 nm wavelength range and the beam splitter matched with the illumination source for the 780 nm wavelength range.

10. The reflectometer system of claim 1, further comprising:
    the illumination source configurable to generate the illumination beam in the 780 nm wavelength range and the bandpass filter matched with the illumination source for the 780 nm wavelength range.

11. The reflectometer system of claim 1, further comprising:
    a concave lens positioned between the primary lens and the detector.

12. A reflectometer system, comprising:
    a primary lens positionable within an illumination shielded area, the illumination shielded area within a housing;
    the primary lens having an observation side and a sample side;
    an illumination source on the observation side of the primary lens capable of generating an illumination beam to project illumination into the illumination shielded area, and a detector positionable on the observation side of the primary lens to detect illumination directed onto the detector from within the illumination shielded area;
    a front surface mirror and a beam splitter within the illumination shielded area on the sample side of the primary lens;
    a goods production area on the sample side of the primary lens;
    the front surface mirror positionable to reflect an illumination beam from the illumination source onto the beam splitter;
    the beam splitter positionable to reflect the illumination beam away from the primary lens into a goods production area, and to permit a reflected beam from the goods production area to pass through to the primary lens and directed to the detector;
    an illumination beam void intermediate the primary lens and the housing;
    the illumination beam void intermediate the illumination source and the front surface mirror; and
    the illumination beam projectable through the illumination beam void.

13. The reflectometer system of claim 12, further comprising:
    a bandpass filter positioned between the beam splitter and the goods production area.

14. The reflectometer system of claim 12, further comprising:
    the beam splitter positionable at about a 45-degree angle to the primary lens.

15. The reflectometer system of claim 12, further comprising:
    the illumination source and the beam splitter matched for the same illumination wavelength range.

16. The reflectometer system of claim 12, further comprising:
    the illumination source and the bandpass filter matched for the same illumination wavelength range.

17. The reflectometer system of claim 12, further comprising:
    the illumination source configurable to generate the illumination beam in the 780 nm wavelength range and the beam splitter matched with the illumination source for the 780 nm wavelength range.

18. The reflectometer system of claim 12, further comprising:
    the illumination source configurable to generate the illumination beam in the 780 nm wavelength range and the bandpass filter matched with the illumination source for the 780 nm wavelength range.

19. The reflectometer system of claim 12, further comprising:
 a concave lens positionable between the primary lens and the detector.

* * * * *